Nov. 29, 1960           L. G. LINDSAY           2,962,437

METHOD OF OPERATING WATER SOFTENING APPARATUS

Filed Jan. 3, 1955           3 Sheets-Sheet 1

INVENTOR.
LYNN G. LINDSAY

BY

ATTORNEY

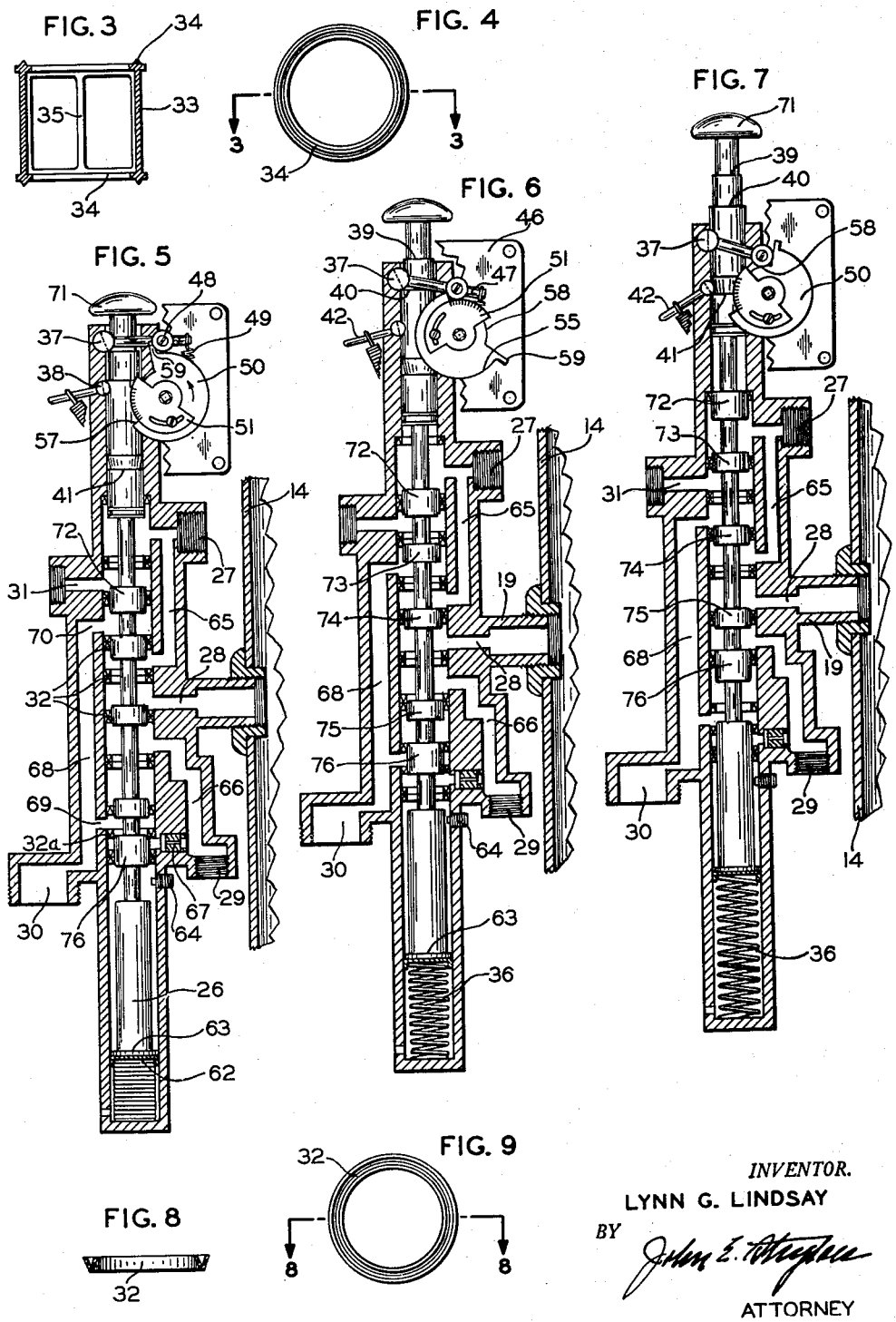

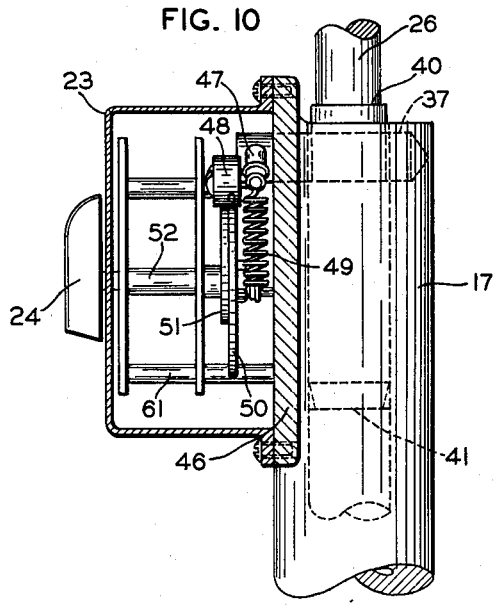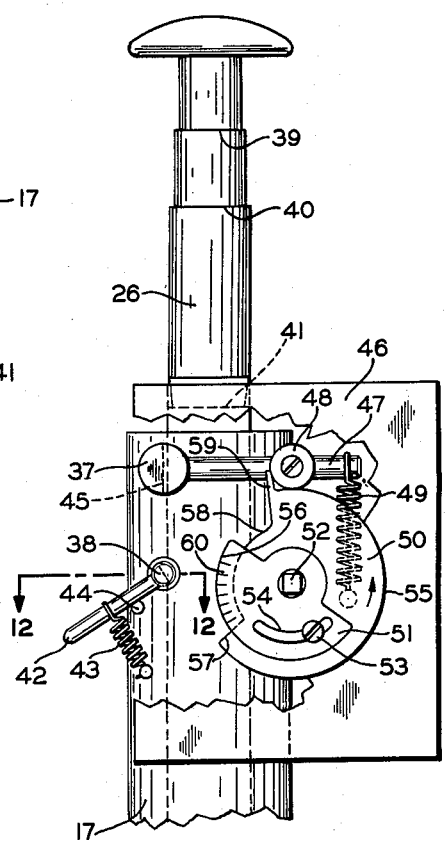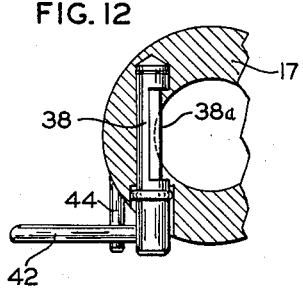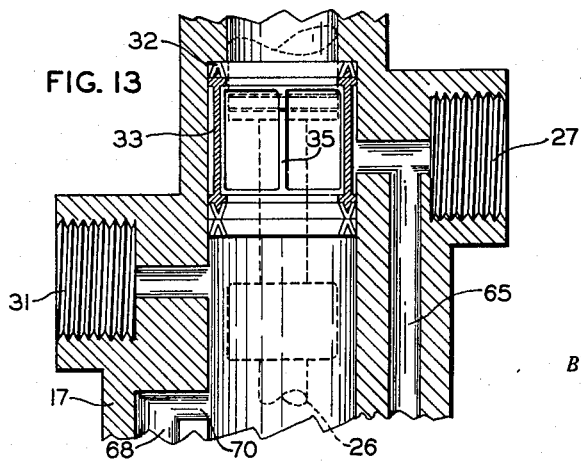
Nov. 29, 1960  L. G. LINDSAY  2,962,437
METHOD OF OPERATING WATER SOFTENING APPARATUS
Filed Jan. 3, 1955  3 Sheets-Sheet 3
FIG. 10
FIG. 11
FIG. 12
FIG. 13
INVENTOR.
LYNN G. LINDSAY
BY
ATTORNEY

United States Patent Office 2,962,437
Patented Nov. 29, 1960

2,962,437

METHOD OF OPERATING WATER SOFTENING APPARATUS

Lynn G. Lindsay, Dellwood, Minn., assignor to Union Tank Car Company, Chicago, Ill., a corporation of New Jersey Filed Jan. 3, 1955, Ser. No. 479,473

5 Claims. (Cl. 210—35)

This invention relates to improved methods of operation of water softeners and controls of the semi-automatic type provided with timing mechanism whereby a water softener may be operated through a complete cycle including the operations of downward flow salting and regenerating, upward flow backwashing, and downward flow softening of the water, the invention being particularly adapted for the control of domestic water softeners having a tank containing a body of zeolite or ion exchange material through which the hard water is passed to a service outlet and wherein the softening material requires regeneration after a period of use.

Water softening apparatus of the down flow type has distinct advantages over those of the up flow type in the softening of waters containing silt, iron and other sediment which accumulates at and near the entering face of the zeolite bed during the water softening operation. In order to remove such impurities from the upper face of the bed upward flow backwashing is necessary. The present invention provides semi-automatic, independently adjustable timing for both the down flow salting and regenerating period and up flow backwashing period followed by a return of the apparatus to normal down flow softening operation.

Since domestic water softeners are usually operated by technically untrained persons, it is important to provide automatic time controls for the periods of regeneration and backwashing, the duration of which can be ascertained in advance, in order to obtain efficient operation with the particular hard water to be treated in each installation. However, completely automatic controls are not feasible for domestic softeners because of the high cost of such installations and it has been found that semi-automatic controls which require only simple manual operations to initiate the salting and regeneration periods, when regeneration is required, and having means for automatically terminating the regenerating and backwashing periods and return of the apparatus to normal water softening service at predetermined times are most efficient and satisfactory for domestic installations. Heretofore, controls of the semi-automatic type have been provided which cause brine and wash water to flow continuously in one direction through the bed, but as far as I am aware simple semi-automatic controls have not heretofore been provided with automatic means for causing the backwashing of the bed for a controlled period of time and then returning the apparatus to water softening service, following the regenerating period.

An object of this invention is to provide improved methods of operating a water softener of the common type wherein a charge of solid regenerating material is deposited on the top of the bed of ion exchange materials preparatory to the regeneration treatment whereby efficient distribution of the regenerating brine and uniformly complete regeneration of the softening material throughout the bed is insured.

Another object is to provide a method of operating a water softener which not only insures efficient distribution of the regenerating brine and uniformly complete regeneration of the softening material throughout the bed but also effects substantial savings in the quantity of water and time required for the backwashing and regenerating treatment.

A further object of my invention is to provide semi-automatic control mechanism for water softening apparatus of the down flow type having means for automatically effecting upward flow of wash water throughout the bed of softening material at the end of the regenerating period and for continuing such backwashing for a determined period and then automatically returning the apparatus to downward flow water softening service.

Another and particular object is to provide such a control with means for adjusting the duration of the regenerating and backwashing periods to compensate for varying amounts and kinds of impurities which may be present in the hard water to be treated in particular localities.

The invention also includes certain other procedural and structural improvements which will be more fully pointed out in the following specification and claims.

Heretofore where the impurities in the local water to be softened have been such as to make periodic backwashing desirable, it has been customary to backwash with upward flow before placing a charge of salt on the upper surface of the bed and causing water to flow downward through the bed for regenerating and flushing treatment. The cycle is completed by returning the softener to normal water softening operation. I have discovered that this method of operation is usually inefficient, resulting in serious loss in the capacity of the ion exchange materials and unnecessary consumption of time and water in the regenerating treatment. This loss and inefficiency is caused by the dumping of the regenerating salt solids on the top of the bed while the latter is in the loosened, expanded condition resulting from the backwashing. Much of the salt settles to a considerable depth or even to the bottom of the bed quickly and before the regenerating solution or brine is formed. The brine subsequently formed from such settled salt is carried out of the tank by the subsequent downwardly flowing water without making contact with the upper and peripheral portions of the bed. The solid salt, whether of the rock or pellet type, as it settles in the bed forms a concentrated body extending down along the axis of the tank and little or no salt is either retained on the top of the bed or reaches the portion near the walls of the tank. Thus brine in the required concentration is not uniformly distributed and much of the ion exchange material remains in unregenerated or only partially regenerated condition when the apparatus is returned to service operation. In many cases only a small fraction of the available capacity of the ion exchange material is utilized.

These difficulties are overcome by my improvements which insure that at the time the bed is given a charge of regenerating solids on its upper surface, it is thoroughly compacted. This result may be obtained either by causing water to flow downward through the bed during normal water softening operation immediately prior to salting or by forced compaction obtained by flowing a considerable quantity of water downward through the bed immediately preceding the salting so that the bed is capable of supporting the charge of salt on its upper surface. The load of salt so supported becomes dissolved and is uniformly distributed throughout the bed during the downflow regeneration.

The present invention includes such improved methods of operation and semi-automatic apparatus for securing the benefits of such methods. My preferred apparatus may be set at one time to operate the softener through a complete cycle, including the regeneration of controlled duration followed, automatically, by upflow backwashing of controlled duration and automatic return of the softener in fully regenerated condition to water softening operation. Backwashing at this stage of the cycle of operation has a further distinct advantage over backwashing preceding the regeneration in that it carries out of the bed not only the solid impurities deposited therein during the water softening, but also those resulting from the reaction of the regenerating material with the ion exchange material.

As hereinbefore indicated, this preferred method of operation and my improved control apparatus are adapted to effect important economies in the total time required to regenerate and backwash as well as in the quantity of water used in these operations and quantity of salt required for each regenerating operation. To enhance these economies, the downflow regeneration may be cut off before all of the brine has been washed out of the lower portions of the bed. This is followed by upflow backwashing which carries the remaining brine upwardly through the bed, thereby utilizing the brine to the fullest extent and reducing the total time and quantity of water consumed in these operations. According to conventional methods, complete removal of the brine requires a period of flushing operation following the regeneration. This is unnecessary with my invention because the flushing is accomplished by the backwashing.

Maximum benefits may be derived from the use of my invention where the water softening material is a cation exchange resin of the non-phenolic type such as that which has gone into general use within the past few years. Such preferred ion exchange resin is described chemically as a sulfonated copolymer of styrene and divinylbenzene. This material is available in substantially strain-free spheroidal particles or grains. Typical physical properties are as follows:

Density (sodium form) 50–53 pounds per cubic foot.
Moisture content 45%, approx.
Void volume 50%.
Effective size 0.45 millimeters.
Uniformity coefficient 1.73.

Approximately 90% of this material passes through a 16 mesh screen and is retained on a 40 mesh screen. The spheroidal articles are elastic and very little volume change occurs when the operation is conducted on the sodium cycle as is usual in water softening apparatus. For best results in the regeneration of this material, brine concentration and brine contact time must be adjusted in relation to the hardness of the water supply available in the various installations.

When ion exchange material of this character is subjected to up flow backwashing water the bed expands approximately in proportion to the rate of upward flow of the water and inversely proportionally to the temperature. For example, when the temperature in the softener tank is approximately 60 degrees F. as a result of a flow rate of 5 gallons per minute per square foot of cross section, the bed expands approximately 40%, but approximately 100% expansion results if the flow rate is increased to 10 gallons per minute per square foot at the same temperature. At higher operating temperatures the percentage of expansion is less for any given rate of flow, but at all ordinary atmospheric and water temperatures and rates of upflow there is considerable expansion and loosening of the bed. When the upward flow of water through the bed is discontinued, a period of time on the order of a half hour or more is required for the bed to settle to its normal size merely by gravity. The rate of settling may, however, be greatly increased by causing water to flow downwardly through the bed. It will thus be apparent that when regeneration requiring the placing of a load of salt on the top of the bed follows immediately after the up flow of water through the bed, much of the salt, due to its higher specific gravity and the expanded bed of spheroidal particles settles substantially below the top of the bed and sometimes reaches the lower levels before the salt is dissolved and made effective in the regenerating treatment.

Referring to the accompanying drawings which illustrate, by way of example and not for the purpose of limitation, one embodiment of my invention:

Fig. 3 is a central vertical section through one of the spacing members for the packing rings;

Fig. 4 is an end view of the spacing member shown in Fig. 3;

Figs. 5, 6 and 7 are views similar to Fig. 2 but with the valve and cam members shown respectively in the regenerating, backwashing and water softening positions;

Figs. 8 and 9 are cross sectional and end views respectively of one of the packing rings;

Fig. 10 is a fragmentary vertical sectional view taken approximately on the line 10—10 of Fig. 1;

Fig. 11 is a fragmentary front elevational view showing details of the valve latch mechanism and cams and with a portion of the support for the timing mechanism broken away to show parts otherwise concealed;

Fig. 12 is a fragmentary horizontal sectional view taken on the line 12—12 of Fig. 11, and Fig. 13 is a fragmentary sectional view of a portion of the valve casing showing details of a pair of the sealing rings and the spacer therefor.

Figure 1:
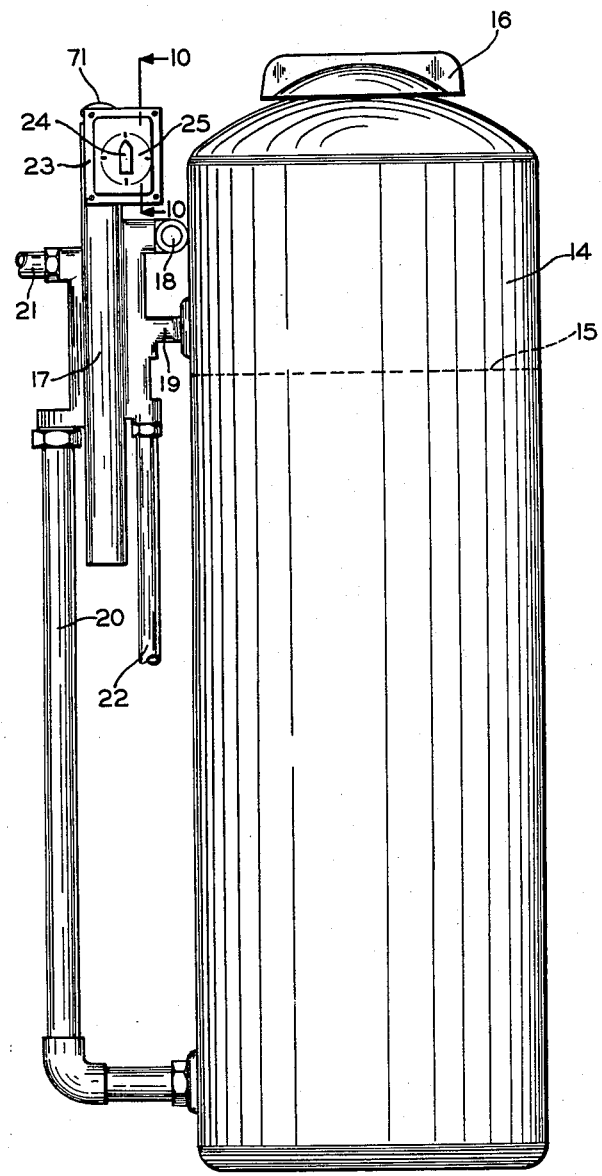
Figure 1 is a side elevational view showing my improved control in operative relation to a water softening tank of common type.

In the drawing (Fig. 1) a water softening tank of common type is indicated by the numeral 14. This tank contains the zeolite or water softening material to approximately the elevation indicated by the broken line 15 and the upper end of the tank is provided with a readily removable cap 16 which allows access to the interior for servicing purposes and particularly for charging it, periodically, with the granular salt required for regeneration. My improved control for the water softener includes a valve casing 17 having ports communicating respectively with a pipe 18 extending to a source of supply of the water to be softened, a connection 19 in communication with the upper portion of the tank 4, a pipe 20 extending to and communicating with the lower portion of the tank, a pipe 21 extending to the service outlets for soft water and a waste or drain pipe 22. Mounted on the upper portion of the casing 17 is a housing 23 containing clock mechanism which is operatively connected to the valve and provided with a manually movable hand 24 adapted to be set by reference to a dial 25 to determine the total period of time required for regenerating and backwashing the bed of softening material in the tank 14.

As illustrated, my improved valve is of the plunger type wherein an elongated valve 26 is slidable in a longitudinal bore in the casing 17 to control the flow of water during the salting, regenerating, backwashing and softening operations. The casing 17 is formed with exterior ports indicated at 27, 28, 29, 30 and 31 which communicate respectively with the inlet pipe 18, connection 19 to the upper portion of the tank, pipe 20 communicating with the lower portion of the tank, service pipe 21 and drain pipe 22. The valve 26 is formed with a series of cylindrical heads and passages between beads for establishing communication between selected inlet and outlet ports. At suitable intervals along the valve a multiplicity of sealing rings 32 are fixed on the walls of the casing bore to embrace the valve and these sealing rings are spaced apart longitudinally of the bore by a number of spacers 33, as shown in detail in Figs. 3, 4 and 13. The sealing rings are preferably of V shape in cross section and are made of a suitable flexible rubber or rubber-like material. Each spacer comprises a pair of spaced circular members 34 formed to fit in contact with the adjacent sealing rings 32 and the members 34 are held in spaced relation one to the other by connecting members 35 which are spaced apart circumferentially of the members 34 to provide openings for the passage of liquid to and from the several ports in the valve casing. The spacers are omitted from Figs. 2, 5, 6 and 7 in order to avoid obscuring the passages communicating with the several ports.

Confined in the lower end portion of the casing 17 is a helical spring 36 which is arranged to bias the valve 26 upward when the latter is in certain of its operative positions and mounted on the upper end portion of the valve casing 17 are latch members 37 and 38 adapted to stop the valve in selected positions as hereinafter described. Longitudinally spaced, annular shoulders 39 and 40 are formed on the valve 26 for successive engagement with the latch member 37 and a third shoulder 41 is formed on the valve for engagement with the latch member 38. As shown in detail in Figs. 11 and 12, the latch member 38 is adapated to be oscillated about a horizontal axis extending tangentially to the periphery of the valve 26 and has a longitudinally extending edge 38a adapted to project above the shoulder 41 to stop the valve in the operative position shown in Fig. 7. Fixed on a projecting end portion of the latch member 38 is a laterally projecting pin 42 to which is connected a helical spring 43 which biases the latch member toward its operative position and against a stop pin 44 projecting from the valve casing. The valve 26 may be released to permit its withdrawal to the position indicated in Fig. 2 by manually actuating the pin 42 against the bias of the spring 43.

As best shown in Figs. 10 and 11, the latch member 37 is mounted in a bore extending crossways in the valve casing 17 and is generally similar to the latch member 38, being provided with a semi-cylindrical portion having an edge 45 adapted to interlock with either of the shoulders 39 or 40 of the valve 26. An end portion of the latch member 37 projects at the front of the casing 23 through a bearing in a supporting plate 46 for the timing mechanism, which is also carried by the casing 23. Fixed on and projecting laterally from the projecting portion of the member 37 is a pin 47 carrying a small cam-engaging roller 48. A spring 49 is connected to the pin 47 and arranged to bias the latch member 37 toward its valve-release position and to retain the roller 48 in contact with the peripheries of cams 50 and 51 of the time control mechanism. These cams are operatively connected to a clock operated shaft 52 which projects rearwardly from clock mechanism in the casing 23. The cam 50 is arranged to rotate with the shaft 52 and cam 51 is mounted on a face of the cam 50 and is movable in an arc about the axis of the shaft 52. Adjustment of the arcuate position of the cam 51 relative to the cam 50 is provided in the form of a set screw 53 which is threaded in the cam 50 and extends through an elongated arcuate slot 54 formed in the cam 51.

The roller 48 rides on peripheral surfaces of cams 50 and 51, which are concentric to the shaft 52, including an arcuate peripheral surface 55 of the cam 50, an arcuate peripheral surface 56 of the cam 51 of smaller radius than the surface 55 and a segment 58 of cam 50. At predetermined times during the cycle of automatic control the roller 48 drops off an end 57 of the surface 55 to the surface 56 of cam 51 and then to segment 58 of the cam 50 at the end of a cycle of operation. A stop finger 59 projects from an end of the arcuate surface 55 for engagement with the roller 48 when the cams are turned clockwise to their maximum time or end position. A time indicator scale 60 is provided on the front face of the cam 51 which by reference to the radial surface 57 of the cam 50 facilitates the adjustment of the relative positions of these cams for the purpose of adjusting the duration of the backwashing.

Since clock mechanism of both the spring wound and electrically operated types suitable for operating the time control cams 50 and 51 are common and commercially available, I have not illustrated or described details of such mechanism. As shown, the clock mechanism may be mounted on a frame 61 within the housing 23 and connected by friction driving means to the shaft 52 so that the latter is automatically turned at a uniform, suitably slow rate through an angle of approximately 360 degrees. Since the maximum time required for regeneration and backwashing is about two hours, the clock mechanism may be geared to turn the shaft 52 approximately 360 degrees in two hours. The hand 24 may be turned clockwise manually to wind the clock mechanism and the latter is operatively connected to the shaft 52 so that the cams 50 and 51 are turned counter-clockwise automatically from the position shown in Fig. 11 or from such other position as may be determined by the setting of the hand 23 by reference to the dial 25 for the total period of time required for regeneration and backwashing of the particular installation.

Figure 2:
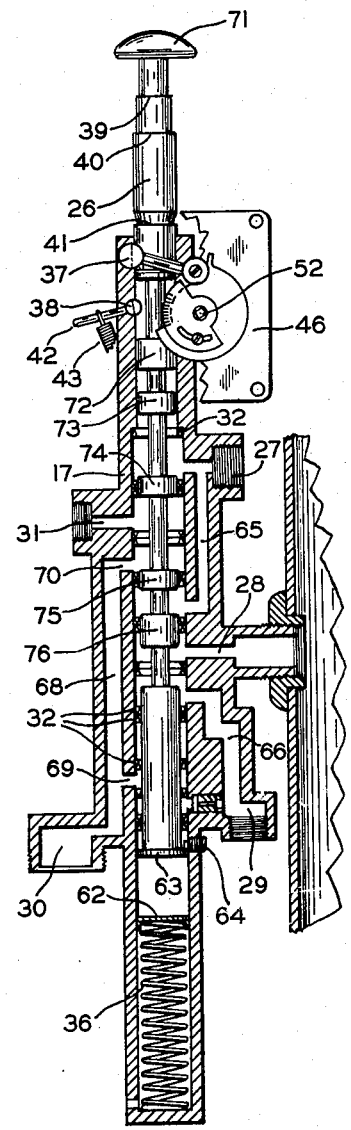
Fig. 2 is a somewhat diagrammatic, fragmentary part longitudinal section and part elevational view showing the control with the automatic cam operating mechanism removed and with the valve in salting position.

Within the lower end portion of the valve casing 17 the spring 36 is provided with a follower 62 for engagement with the lower end of the valve 26 and a shoulder 63 is formed on the valve for engagement with a stop screw 64 which limits upward movement of the valve to the position shown in Fig. 2. Formed in the wall of the casing 17 and communicating with the port 27 is a passage 65 having openings at its upper and lower ends communicating with the casing bore containing the valve 26. Another longitudinally extending passage 66 connects the drain port 29 to the valve bore at longitudinally spaced points, one of the connecting openings being located directly below the port 28 and the other comprising a restricted passage 67 communicating with the casing bore for controlling the rate of flow to drain during the regenerating period. From the port 30 a passage 68 extends upward in the valve casing and is provided with openings 69 and 70 communicating with the casing bore. Fixed on the upper end of the valve 26 is a handle 71 which is accessible for manual operation of the valve. Intermediate its upper and lower end portions, the valve is formed with spaced cylindrical members 72, 73, 74, 75 and 76 which coact with the several sealing rings 32 in controlling the flow of water between the several passages and ports of the casing.

Operation

After a period of use the water softening material in the tank 14 requires regeneration and a predetermined quantity of common salt may be placed in the upper portion of the tank through the opening afforded by removal of the cap 16. Before removing this cap, the operator merely raises the latch pin 42 to disengage the projecting edge of the latch member 38 from the valve and then pulls the valve 26 upward to the position shown in Fig. 2 wherein the shoulder 63 on the valve engages the stop screw 64. This cuts off the supply of water under pressure to the tank 14 by closing communication between the port 27 with all other ports, as will be evident from Fig. 2 in which the port 27 and its connected passage 65 are sealed off by valve members 73, 74, 75 and 76 which are in engagement with sealing rings 32 suitably located in the casing bore. With the valve in this position the port 28, communicating with the upper portion of the tank, is connected through the passage 66 extending to the drain port 29 so that sufficient water flows to drain from the tank to permit the tank to receive the charge of salt. The cap 16 is then removed, the charge of salt required for regeneration is placed in the tank and the cap is returned to its closed position. Since the bed of ion exchange material is in compact condition caused by downflow during the soft water service operation the charge of salt is supported on the bed and covers the entire top surface.

As the next step in the operation, the hand 24 of the timing mechanism is turned clockwise and set for the period required for regeneration and backwashing. This turns the cams 50 and 51 to a position such as that indicated in Fig. 5 wherein the roller 48 is supported in a selected position on the surface 55 of the cam 50. Thereupon the operator actuates the handle 71 to thrust the valve downward to its lowermost position shown in Fig. 5. No further manual operation is required since the operation of timing and terminating the regeneration and backwashing and return of the apparatus to water softening operation is automatic.

With the valve in the position indicated in Fig. 5, the clock mechanism operates to turn the cams 50 and 51 counterclockwise and regeneration is accomplished by causing water to flow from the inlet port 27 through the passage 65 and casing bore between valve members 73 and 74, out through port 28 to the tank wherein salt is dissolved and carried downward through the water softening material. The spent brine and hardening impurities are carried out through the riser pipe 20 to port 30, thence through opening 69 into the casing bore and out through the restricted passage 67 and port 29 to drain. Only slight clearance between sealing rings 32a and the upper end of valve member 76 is required because a relatively low rate of flow to drain during regeneration is desirable. During the regeneration period hard water is supplied to the service pipe 21 from the port 27 through the casing bore above valve member 72 and port 31.

The valve remains in the position indicated in Fig. 5 during the time required for the timing mechanism to turn the cam 50 to a point where the roller 48 drops off the end 57 of the cam surface 55, as indicated in Fig. 6, thereby disengaging the latch member 37 from the shoulder 39 and allowing the spring 36 to move the valve upward until it is stopped by the latch 37 which is now in the position for engagement with the shoulder 40. This is the backwashing position of the valve which establishes reverse flow through the tank for the predetermined period of time required to remove deposits of solid impurities from the softening material. Water now flows from the source of supply, in through the port 27, down through the passage 65 to the opening between the valve members 73 and 74, thence downward through the passage 68, port 30 and riser pipe 20, upward through the water softening material in the tank and out through the connection 19, port 28, space between the valve members 74 and 75 to passage 66, port 29 and drain pipe 22.

For most economical operation it is desirable to terminate the down flow during regeneration and while some brine remains in the lower portions of the bed. A suitable adjustment may be made by means of the relatively movable cams 50 and 51 and by proper setting of the manually controlled clock mechanism whereby the total time required for regenerating and backwashing any particular installation may be determined and set in advance.

Backwashing of the bed continues while the timing mechanism rotates the cams 50 and 51 through an arc such as to cause the roller 48 to drop off the end of the cam 51 to rest on the segment 58 of the cam 50. As indicated in Fig. 7, the resulting downward oscillation of the arm 47 under the bias of the spring 49, causes the latch member 37 to be disengaged from the shoulder 40 and the spring 36 thereupon moves the valve upward to a position where the latch member 38 engages the shoulder 41. This completes the cycle of operation and no further attention to the water softener is required until until such time as further regeneration is necessary. When in the position shown in Fig. 7, the valve establishes the flow required for normal water softening service. It will be evident from Fig. 7 that hard water enters the inlet port 27 and flows through the passage 65, the space between the valve members 74 and 75 to the port 28 and connection 19 with the upper portion of the tank, and then flows downward through the water softening material and out through the riser pipe 20 to port 30, thence through passage 68 to the opening between the valve members 73 and 74 and out to the service pipe through port 31.

This same control may be used to carry out my alternate method including the steps of backwashing the bed, then compacting the bed, then salting and regenerating and return of the softener automatically to water softening operation. This cycle is started by actuating the knob 71 to set the plunger in the position for backwashing indicated in Fig. 6 of the drawing and setting the time control hand 28 in the backwashing position with reference to the dial. Thereupon the control causes backwashing by upward flow through the bed to waste for a predetermined period followed by automatic return to downflow service. The operator then turns on a service outlet and allows sufficient water to flow through the bed in a downward direction to compact it. He then deposits a charge of salt on the top of the compacted bed and starts the regenerating operation, as hereinbefore described. The use of this method of operating the control is particularly advantageous where the water to be softened is turbid, containing solid matter which should be removed from the bed by backwashing both before and after the regenerating treatment.

To gain access to the cams 50 and 51 for timing adjustments, the clock mechanism in the casing 23 is removed from the supporting plate 46 and the square rear end of the shaft 52 is withdrawn from the central bearing in the cam 50. Thereupon the angular position of the cam 51 relative to the cam 50 may be adjusted by suitable manipulation of the set screw 53 so that the arcuate segment of the cam 51 which supports the roller 48 during the backwashing may be extended in proportion to the time required for backwashing in various installations where the kinds and quantities of impurities in the water to be treated varies. Where, for example, the water to be softened contains large percentages of certain impurities such as iron compounds and calcium and magnesium salts, a relatively long period of backwashing is desirable as compared with softeners treating water having smaller percentages of these and other impurities. My improved control provides for easy adjustment of the duration of the backwashing period independently of the regeneration period. It will be further evident that the total time required for regeneration and backwashing is variable merely by appropriate setting of the hand 24 relative to the scale on the dial 25 at the start of the period for regeneration.

A large number of comparative tests have been conducted showing that my improved method secures the advantages over conventional methods hereinbefore pointed out. These tests show that the actual ion exchange capacity of the mineral obtained by my method closely approaches the theoretical capacity and that both the quantity of water and time consumed in the regenerating and backwashing operations are greatly reduced by my method as compared with conventional methods of operation. These tests were conducted in water softening apparatus of seven different domestic and commercial sizes and with water of two different hardnesses. In each of the tests the actual capacity was determined by the number of gallons of water of known hardness that could be softened to one grain or less of hardness per gallon, as shown by the conventional soap test, during a single softening operation. This actual capacity was compared with the theoretical capacity given by the manufacturer of the ion exchange material in grains per gallon per cubic foot of resin in computing the actual percent of capacity obtained in each test. All of the softeners contained ion exchange material of the character hereinbefore described and the salt used for regeneration was of the special pelletized type designed for water softener use.

Comparison was made under identical conditions between my improved method comprising the steps of (1) adding salt, (2) regenerating, (3) backwashing, and (4) softening, with conventional systems wherein the procedure is performed in the following sequence: (1) backwashing, (2) gravity settling of the bed, (3) adding salt, (4) regenerating, (5) softening. In one series of tests of this conventional method, wherein the bed of ion exchange material was allowed to settle for five minutes before salting, the average percent of the theoretical capacity of the mineral was equal to approximately 40%, whereas, in the similar tests of my method, using the same group of softeners, an average capacity of approximately 97% of the theoretical capacity was obtained. The total time consumed in the regenerating and backwashing, according to the conventional method, was in each test considerably longer than the corresponding time required where my improved method was used. Since the quantity of water used for regeneration and backwashing is proportional to the time consumed in these operations, the quantity of water required for the conventional method was also greatly in excess of that required for the corresponding operations when my improved method was used.

In each of these tests the rate of flow during regeneration and backwashing was in accordance with the recommendations of the manufacturer of each softener and the recommended quantity of salt was used in each regenerating operation. Somewhat higher capacity can be obtained from the regenerating material if an excess of salt is used in the conventional method as compared with the quantity of salt used in the comparative tests of my method. However, these tests clearly indicate that it is not possible, by the conventional method, to obtain economies and efficiency in the use of the total capacity of the mineral comparable with those obtained by my method wherein the backwashing follows the regenerating treatment.

Another series of tests was conducted wherein the results obtained by my preferred method were compared with those obtained by my alternate method wherein the procedure and successive steps were as follows: (1) backwash, (2) forced setting of the bed by causing water to flow downward for five minutes after upflow backwashing, (3) add salt, (4) regenerate, (5) soften. This series of tests shows that an average of from 60% to 70% of the theoretical capacity of the mineral may be obtained by my alternate method. The quantity of water and total time required for regenerating and backwashing are also greater than the corresponding time and quantity of water consumed according to my preferred method.

The present application is a continuation in part of my application for patent for Control Mechanism for Water Softening Apparatus, Serial No. 157,717, filed April 24, 1950, now abandoned.

I claim:

1. The method of operating a water softener containing a bed of ion exchange resin in the form of spheroidal particles which includes the steps of causing water to flow upwardly through the bed for a predetermined fixed period of time whereby the bed is expanded, then forcibly compacting the bed by flowing water downwardly through it, then depositing on the top surface of the compacted bed a charge of solid regenerating material of relatively high specific gravity, and regenerating the bed by causing water to flow downwardly through said charge and bed for a predetermined fixed period of time.

2. The method of operating water softening apparatus of the up-flow-type containing a bed of softening material requiring periodic regeneration, said material having the form of spheroidal particles which comprises, flowing water downwardly through said bed to compact the same, depositing a charge of solid regenerating material of relatively high specific gravity on the top surface of the compacted bed, causing water to flow downwardly through said charge and bed for a predetermined fixed period of regeneration and subsequently causing water to flow upwardly through said bed for a predetermined fixed period of time to backwash the same.

3. The method of operating water softening apparatus containing a bed of ion exchange resin in the form of spheroidal particles requiring periodic regeneration which comprises, flowing water downwardly through said bed to compact the same, then depositing a charge of solid regenerating material of relatively high specific gravity on the top surface of the compacted bed, then causing water to flow downwardly through said charge and bed for a predetermined fixed period of time required to effect incomplete regeneration of the bed and then causing fresh water to flow upwardly through said bed for a predetermined fixed period of time to backwash and complete the regeneration of the same.

4. The method of operating water softening apparatus containing a bed of ion exchange resin in the form of spheroidal particles requiring periodic regeneration which comprises, flowing water downwardly through said bed to compact the same, depositing a charge of solid regenerating material of relatively high specific gravity on the top surface of the compacted bed, causing water to flow downwardly through said charge and bed for a predetermined fixed period of time whereby a solution of the regenerating material is carried into and through said bed, terminating the downflow before all of said solution has been removed from the bed and then causing water to flow upwardly through said bed for a predetermined fixed period of time to backwash the same and to complete the regenerating treatment.

5. The method of regenerating a body of granular water softening material having a concentration of impurities in the upper portion thereof resulting from downward flow of water through the bed during water softening operation which comprises, depositing on the top surface of the compacted bed a charge of solid water-soluble regenerating material of relatively high specific gravity causing a solution of regenerating material to flow downwardly through said body to waste for a predetermined fixed period of time and then causing water to flow upwardly through said body to waste for a predetermined fixed period of time, thereby to backwash the same and remove both impurities resulting from the regenerating reaction and those deposited in the body during the water softening operation.

References Cited in the file of this patent

UNITED STATES PATENTS

| | | |
|---|---|---|
| 1,452,288 | Caps | Apr. 17, 1923 |
| 1,605,652 | Dotterweich | Nov. 2, 1926 |
| 1,676,891 | Dunkelberg | July 10, 1928 |
| 1,697,835 | McGill | Jan. 1, 1929 |
| 1,839,428 | Waugh | Jan. 5, 1932 |
| 2,292,801 | Slidell | Aug. 11, 1942 |
| 2,338,667 | Riche | Jan. 4, 1944 |
| 2,347,201 | Lindsay | Apr. 25, 1944 |
| 2,564,066 | Jordan | Aug. 14, 1951 |
| 2,636,560 | Rogers | Apr. 28, 1953 |
| 2,660,558 | Juda | Nov. 24, 1953 |
| 2,665,251 | Mendenhall | Jan. 5, 1954 |
| 2,669,713 | Osmun | Feb. 16, 1954 |
| 2,796,177 | Kryzer | June 18, 1957 |